US012772066B2

(12) United States Patent
Boch et al.

(10) Patent No.: US 12,772,066 B2
(45) Date of Patent: Oct. 20, 2026

(54) USING SHARED RADIO RESOURCES TO PROVIDE ENTERPRISE WIRELESS SERVICE BY MOBILE NETWORK OPERATORS

(71) Applicant: Dell Products, L.P., Round Rock, TX (US)

(72) Inventors: Erik Boch, Ottawa (CA); Matthew Wingo, Rockwall, TX (US); Chris Thomas, Virginia Beach, VA (US); Eddy Fung, Aurora (CA)

(73) Assignee: Dell Products L.P., Round Rock, TX (US)

( * ) Notice: Subject to any disclaimer, the term of this patent is extended or adjusted under 35 U.S.C. 154(b) by 373 days.

(21) Appl. No.: 18/468,393

(22) Filed: Sep. 15, 2023

(65) Prior Publication Data

US 2025/0097718 A1 Mar. 20, 2025

(51) Int. Cl.

*H04W 16/14* (2009.01)
*H04W 72/0453* (2023.01)
*H04W 88/08* (2009.01)
*H04W 88/10* (2009.01)

(52) U.S. Cl.

CPC ....... *H04W 16/14* (2013.01); *H04W 72/0453* (2013.01); *H04W 88/085* (2013.01); *H04W 88/10* (2013.01)

(58) Field of Classification Search

CPC .......................... H04W 16/14; H04W 72/0453
See application file for complete search history.

(56) References Cited

U.S. PATENT DOCUMENTS

2004/0090943 A1* 5/2004 da Costa ............. H04L 43/0811 370/338
2020/0245344 A1* 7/2020 Krishnaswamy ..... H04W 72/50
2021/0037444 A1* 2/2021 Harel .................... H04W 16/14
2021/0400732 A1* 12/2021 Xue .......................... H04L 5/14
2023/0199789 A1* 6/2023 Zhang ................... H04W 72/23 370/329
2023/0413308 A1* 12/2023 Kotaru ................ H04W 72/541
2024/0048995 A1* 2/2024 Dutta .................... H04W 28/26
2024/0393470 A1* 11/2024 Jayaram .............. H04W 64/003

* cited by examiner

*Primary Examiner* — David Bilodeau

(74) *Attorney, Agent, or Firm* — Amin, Turocy & Watson, LLP

(57) ABSTRACT

The technologies described herein are generally directed toward using shared radio resources to provide wireless services by multiple mobile network operators. In an embodiment, a method can include receiving a first communication signal via a first wireless provider network and a second communication signal via a second wireless provider network. The method can further include communicating, via first radio spectra shared by the first wireless provider network and the second wireless provider network, the first communication signal and the second communication signal. Further, the method can include receiving a third communication signal via the first wireless provider network and a fourth communication signal via the second wireless provider network. The method can further include, based on an instruction, communicating, via second radio spectra not shared by the first wireless provider network and the second wireless provider network, the third communication signal and the fourth communication signal.

20 Claims, 10 Drawing Sheets

500

USING SHARED RADIO RESOURCES TO PROVIDE ENTERPRISE WIRELESS SERVICE BY MOBILE NETWORK OPERATORS

BACKGROUND

Modern wireless networks can use a variety of approaches to operate more efficiently. In some circumstances, wireless infrastructure can be deployed to reduce the cost and complexity of providing wireless connectivity within an enterprise site. Often, the utilization of this enterprise wireless infrastructure by mobile network operators can be hindered by the capabilities of the infrastructure components installed, and the inflexible nature of expanding these capabilities.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to receive a first communication signal via a first wireless provider network and a second communication signal via a second wireless provider network. The instructions can further include an instruction to communicate, via first radio spectra shared by the first wireless provider network and the second wireless provider network, the first communication signal and the second communication signal. Further, the instructions can include an instruction to receive a third communication signal via the first wireless provider network and a fourth communication signal via the second wireless provider network. The instructions can further include an instruction to, based on an instruction, communicate, via second radio spectra not shared by the first wireless provider network and the second wireless provider network, the third communication signal and the fourth communication signal.

Additionally, or alternatively, the system can utilize shared radio resource unit equipment for communicating the first communication signal, the second communication signal, the third communication signal, and the fourth communication signal. Additionally, or alternatively, the shared radio resource unit equipment can include shared wireless access point equipment. Additionally, or alternatively, the first communication signal and the second communication signal can be communicated in accordance with a multi-operator core-network configuration. Additionally, or alternatively, the third communication signal and the fourth communication signal can be communicated in accordance with a mobile operator radio access network configuration, and wherein the instruction can include instruction information to utilize the mobile operator radio access network configuration.

Additionally, or alternatively, the first communication signal and the second communication signal can be received via shared core network equipment. Additionally, or alternatively, the shared core network equipment can include a shared central unit coupled to a shared distributed unit. Additionally, or alternatively, the third communication signal and the fourth communication signal can be received via first wireless provider core network equipment and second wireless provider core network equipment, respectively. Additionally, or alternatively, the third communication signal and the fourth communication signal can be received via respective separate core networks of the first wireless provider network and the second wireless provider network. Additionally, or alternatively, the second radio spectra can include radio spectra respectively allocated to the first wireless provider network and the second wireless provider network.

An example method can include, receiving, by a radio resource device, from a shared core device, a first communication signal via a first wireless provider network and a second communication signal via a second wireless provider network. The method can further include, communicating, using first radio spectrum shared by the first wireless provider network and the second wireless provider network, the first communication signal and the second communication signal. Further, the method can include, receiving, via respective provider-operated core devices, a third communication signal via the first wireless provider network and a fourth communication signal via the second wireless provider network. The method can further include communicating, using second radio spectrum not shared by the first wireless provider network and the second wireless provider network, the first communication signal and the second communication signal to a destination device.

Additionally, or alternatively, the radio resource device can include shared wireless infrastructure capable of communicating via the first radio spectrum and the second radio spectrum. Additionally, or alternatively, the radio resource device can include shared wireless access point equipment. Additionally, or alternatively, the respective provider-operated core devices comprise virtual central unit equipment and virtual distributed unit equipment hosted by the radio resource device. Additionally, or alternatively, the second radio spectrum comprise radio spectrum respectively allocated to the first wireless provider network and the second wireless provider network.

An example non-transitory computer-readable medium can include instructions that, in response to execution, cause a system including a processor to perform operations. These operations can include receiving a first communication signal via a first wireless provider network and a second communication signal via a second wireless provider network. The operations can further include communicating, via first radio spectra shared by the first wireless provider network and the second wireless provider network, the first communication signal and the second communication signal. The operations can further include receiving a third communication signal via the first wireless provider network and a fourth communication signal via the second wireless provider network. The operations can further include, based on an instruction, communicating, via second radio spectra not shared by the first wireless provider network and the second wireless provider network, the third communication signal and the fourth communication signal.

Additionally, or alternatively, the first different communication signals and the second different communication signals can be communicated by shared equipment of a shared wireless infrastructure managed by the network equipment. Additionally, or alternatively, the first different communication signals and the second different communication signals can be communicated by shared equipment of a shared wireless infrastructure managed by the network equipment. Additionally, or alternatively, the second different communication signals can be received via core network equipment that was respectively managed by the different wireless communication network providers. Additionally, or alternatively, the first different communication signals can be respectively received via shared core network equipment.

Additionally, or alternatively, the first different communication signals can be respectively communicated using radio spectrum respectively allocated to be usable by the different wireless communication network providers. Additionally, or alternatively, the second different communication signals can be received via core network equipment that was respectively managed by the different wireless communication network providers. Additionally, or alternatively, the first different communication signals can be respectively received via shared core network equipment. Additionally, or alternatively, the first different communication signals can be respectively communicated using radio spectrum respectively allocated to be usable by the different wireless communication network providers.

Other embodiments may become apparent from the following detailed description when taken in conjunction with the drawings.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate using shared radio resources to provide wireless services by multiple mobile network operators. As is understood by one having skill in the relevant art(s), given the description herein, the implementation(s) described herein are non-limiting examples, and variations to the technology can be implemented. For instance, even though many examples described herein discuss mobile network operator networks, the technologies described herein can be used in many applicable circumstances, e.g., for private networks or combinations of public and private networks. As such, any of the embodiments, aspects, concepts, structures, functionalities, implementations and/or examples described herein are non-limiting, and the technologies described and suggested herein can be used in various ways that provide benefits and advantages to wireless networking technology in general, both for existing technologies and technologies in this and similar areas that are yet to be developed.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
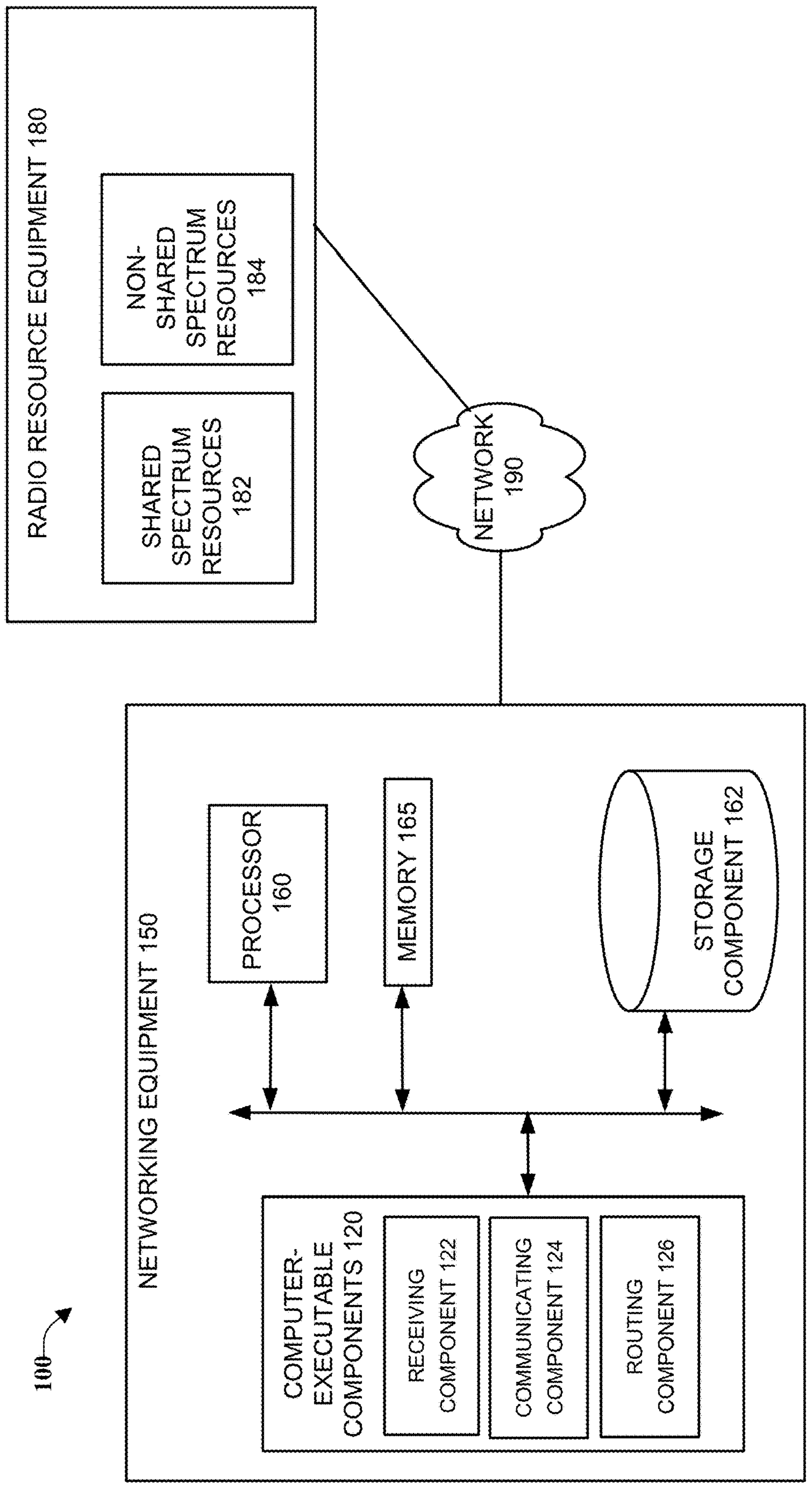
FIG. 1 is an architecture diagram of an example system that can facilitate using shared radio resources to provide wireless services by multiple mobile network operators, in accordance with one or more embodiments.

FIG. 1 is an architecture diagram of an example system 100 that can facilitate using shared radio resources to provide wireless services by multiple mobile network operators, in accordance with one or more embodiments. For purposes of brevity, description of like elements and/or processes employed in other embodiments is omitted. As depicted, system 100 includes networking equipment 150 connected to radio resource equipment 180 via network 190. As depicted, radio resource equipment 180 includes shared spectrum (SS) resources 182 and non-shared (e.g., licensed spectrum (LS)) spectrum resources.

In some implementations, mobile network operators (MNOs) can prioritize the use of LS allocations over the use of SS allocations. In some implementations, a multi-MNO (e.g., neutrally hosted) network can be supported by one or more embodiments, e.g., relying on separate hardware and software stacks to support licensed band deployments. In additional or alternative embodiments, a unified infrastructure can be used to facilitate the use of SS and LS by multiple MNOs. One or more embodiments can provide hosted networking that can operates neutrally for multiple MNOs. As described herein, a shared network infrastructure can reduce the cost and complexity of deployment for the hosted network entities, e.g., providing solutions to increasing coverage/capacity demands, increasing networking costs, and flat/reducing user revenues. In some implementations, use of the unified infrastructure described herein can results, compared to non-unified approaches, in a lower cost of ownership, reduced physical footprint and power consumption, and overall infrastructure demands.

As depicted, networking equipment 150 includes memory 165, processor 160, and storage component 162. According to multiple embodiments, memory 165 of networking equipment 150 can store one or more computer and/or machine readable, writable, and/or executable components 120 and/or instructions. In one or more embodiments, computer-executable components 120, when executed by processor 160, can facilitate performance of operations defined by the executable component(s) and/or instruction(s). Computer executable components 120 can include receiving component 122, communicating component 124, routing component 126, and other components described or suggested by different embodiments described herein, that can improve the operation of system 100 or other systems described herein.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure. In some embodiments, memory 165 can comprise non-volatile random-access memory (NVRAM).

It is understood that the computer processing systems, computer-implemented methods, apparatus, and computer program products described herein employ computer hardware and/or software to solve problems that are highly technical in nature (e.g., utilizing different radio spectra to serve customers using both SS and LS resources), that are not abstract and cannot be performed as a set of mental acts by a human. For example, a human, or even a plurality of humans, cannot efficiently handle the complex, rapid allocation of spectrum to a combination of different types of UE.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of receiving component 122, which can in some implementations receive a first communication signal via a first wireless provider network and a second communication signal via a second wireless provider network. For example, one or more embodiments, receiving component 124 can receive a first communication signal via a first wireless provider network and a second communication signal via a second wireless provider network. In an example implementation, to serve respective customers, a first MNO and a second MNO can each provide a signal to networking equipment 150.

In another example, memory 165 can store executable instructions that can facilitate generation of communicating component 124, which can, in some implementations communicate, via first radio spectra shared by the first wireless provider network and the second wireless provider network, the first communication signal and the second communication signal. For example, one or more embodiments, communicating component 124 can communicate, via first radio spectra shared by the first wireless provider network and the second wireless provider network, the first communication signal and the second communication signal. Continuing the example, after receiving the signals from the MNOs, communicating component 124 can utilize SS resources 182 to transmit the signals to UEs from both MNOs.

In another example, memory 165 can store executable instructions that further cause receiving component 122 to receive a third communication signal via the first wireless provider network and a fourth communication signal via the second wireless provider network. For example, one or more embodiments, receiving component 122 can further receive a third communication signal via the first wireless provider network and a fourth communication signal via the second wireless provider network. Continuing the example, to serve additional respective customers, the first MNO and the second MNO can each provide an additional signal to receiving component 122 of networking equipment 150.

In another example, memory 165 can store executable instructions that can facilitate generation of routing component 124, which can, in some implementations, based on an instruction, communicate, via second radio spectra not shared by the first wireless provider network and the second wireless provider network, the third communication signal and the fourth communication signal. For example, one or more embodiments, routing component 124 can, based on an instruction, communicate, via second radio spectra not shared by the first wireless provider network and the second wireless provider network, the third communication signal and the fourth communication signal. Continuing the example, after receiving the additional signals from the MNOs, communicating component 124 can non-shared spectrum resources 184 (LS resources) to transmit the signals to UEs from both MNOs. In one or more embodiments, no deployment of additional resources for RR equipment 180 or networking equipment 150 are required.

It is appreciated that the embodiments of the subject disclosure depicted in various figures disclosed herein are for illustration only, and as such, the architecture of such embodiments are not limited to the systems, devices, and/or components depicted therein. For example, in some embodiments, networking equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

It should be noted that networking equipment 150, and other equipment discussed herein, can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as networking equipment 150. For example, one or more of networking equipment 150, and other equipment discussed herein can all be separate subsystems running in the kernel of a computing device as well as operating on separate network equipment, e.g., as depicted in FIG. 1.

Figure 2:
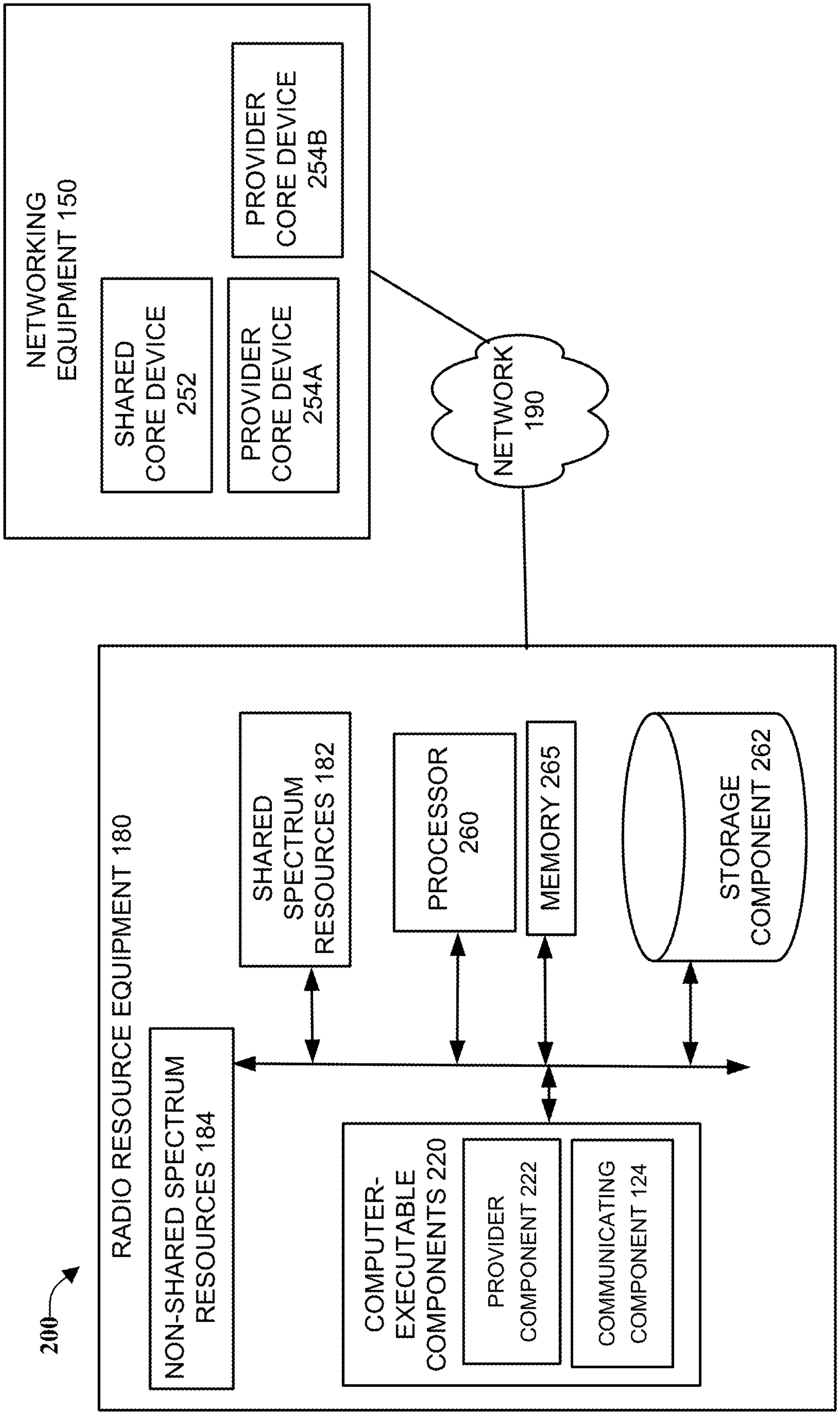
FIG. 2 is an architecture diagram of an example system that can facilitate using shared radio resources to provide wireless services by multiple mobile network operators, in accordance with one or more embodiments.

FIG. 2 is an architecture diagram of an example system 200 that can facilitate using shared radio resources to provide wireless services by multiple mobile network operators, in accordance with one or more embodiments. For purposes of brevity, description of like elements and/or processes employed in other embodiments is omitted. As depicted, system 200 includes networking equipment 150 connected to radio resource equipment 180 via network 190.

As depicted, radio resource equipment 180 can include processor 260 (e.g., similar to processor 160) and storage device 262 (e.g., similar to storage component 162). According to multiple embodiments, radio resource equipment 180 can further include memory 265 (similar to memory 165) that can store one or more computer and/or machine readable, writable, and/or executable components 220 and/or instructions that, when executed by processor 260, can facilitate performance of operations defined by the executable component(s) and/or instruction(s). According to multiple embodiments, memory 265 can store one or more computer and/or machine readable, writable, and/or executable components 220 and/or instructions, which can, when executed by processor 260, facilitate performance of operations defined by the executable components including provider component 222, communicating component 224, and other components described or suggested by different embodiments described herein, that can facilitate and improve the operation of system 200.

In one or more embodiments, computer executable components 220 can be used in connection with implementing one or more of the systems, devices, components, and/or computer-implemented operations shown and described in connection with FIG. 2 or other figures disclosed herein. In an example implementation of radio resource equipment 180, memory 265 can store executable instructions that can facilitate generation of provider component 222, which in some implementations, can receive, from a shared core device, a first communication signal via a first wireless provider network and a second communication signal via a second wireless provider network. For example, in one or more embodiments, provider component 222 can receive communication signals from the first MNO and the second MNO via shared core device 252.

In an additional example implementation of radio resource equipment 180, memory 265 can store executable instructions that can facilitate generation of communicating component 224, which in some implementations, can communicate, using first radio spectrum shared by the first wireless provider network and the second wireless provider network, the first communication signal and the second communication signal. For example, in one or more embodiments, communicating component 224 can communicate to respective first and second MNO UEs via shared spectrum resources 182.

Continuing this example, provider component 222 can further receive, from respective provider operated core devices, a third communication signal via the first wireless provider network and a fourth communication signal via the second wireless provider network. For example, in one or more embodiments, provider component 222 can further receive communication signals from the first MNO and the second MNO via respective provider core devices 254A-B.

Continuing this example, communicating component 224, can further communicate, using second radio spectrum not shared by the first wireless provider network and the second wireless provider network, the third communication signal and the fourth communication signal to a destination device. Continuing the example above, communicating component 224, can further communicate, using respective non-shared spectrum resources 184, the third communication signal and the fourth communication signal to respective UEs of the first and second MNOs. It is important to note that, in contrast with other approaches, radio resource equipment 180 can be deployed at a site with capabilities of handing signals originating from both shared core device 252 and provider core devices 254A-B.

As discussed further below, signals originating from shared core device 252 can be characterized as being provided by Multi Operator Core Network (MOCN) functionality, e.g., user traffic associated with the UEs of multiple MNOs are hosted on a singular, shared radio infrastructure. In contrast, signals originating from shared core device 252 can be characterized as being provided by MORAN (Multi-Operator Radio Access Network) functionality, e.g., user traffic associated with the UEs of multiple MNOs are hosted on non-shared spectrum. Because one or more embodiments includes aspects of both approaches, combined with additional capabilities, some embodiments can be characterized as a hybrid approach to these functionalities. Continuing the disclosure below, the discussion of FIGS. 3 and 4 further discuss provider core devices 254A-B and FIG. 5 discusses SS resources 182 and non-shared spectrum resources 184. Example SS resources 182 include Citizens Broadband Radio Service (CBRS bands), and non-shared spectrum resources 184 include portions of so-called 'C-band' spectrum licensed for exclusive use by particular MNOs.

Figure 3:
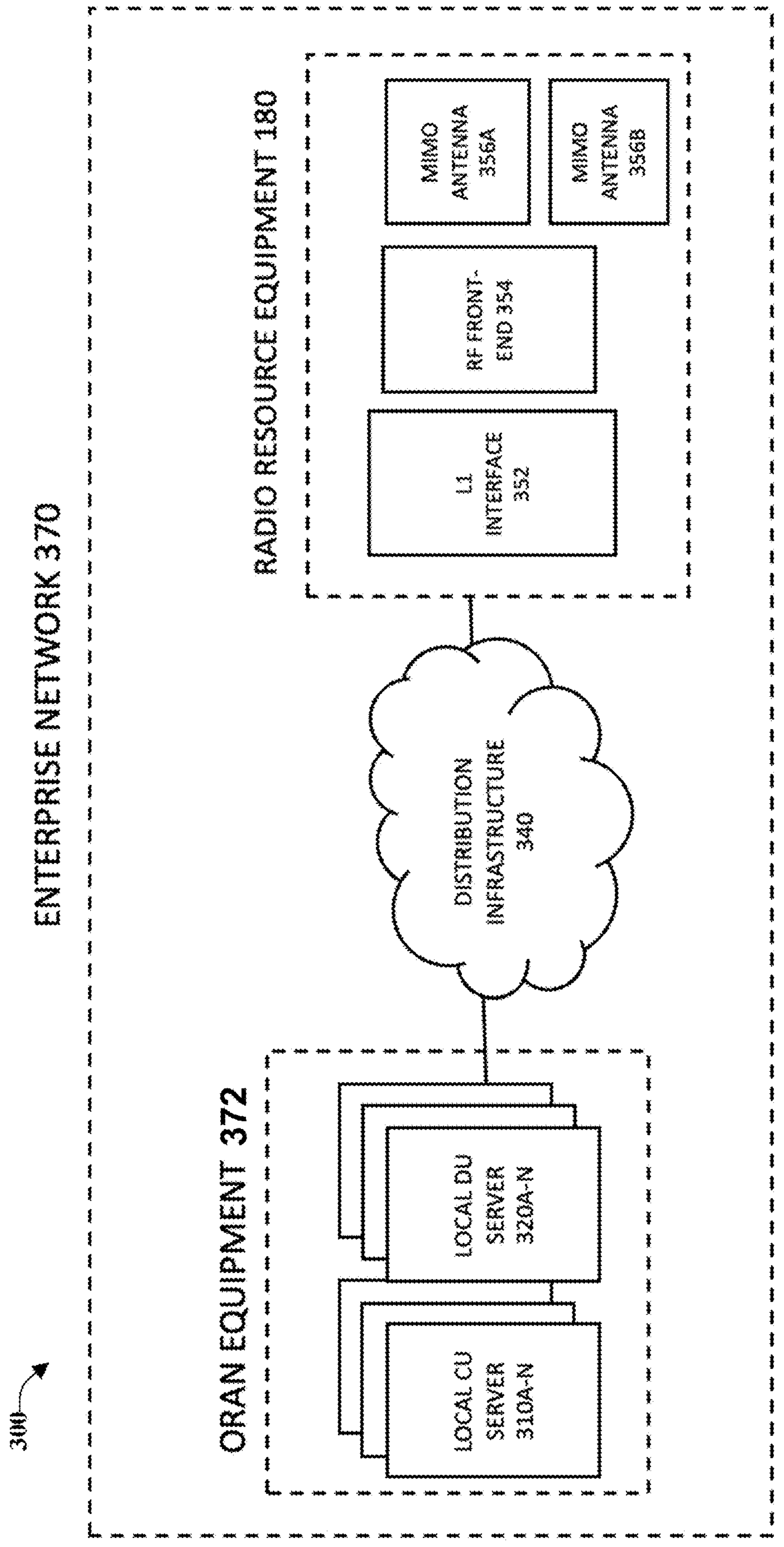
FIG. 3 is an architecture diagram of an example system that can facilitate using shared radio resources to provide wireless services by multiple mobile network operators, in accordance with one or more embodiments.

FIG. 3 is an architecture diagram of an example system 300 that can facilitate using shared radio resources to provide wireless services by multiple mobile network operators, in accordance with one or more embodiments. For purposes of brevity, description of like elements and/or processes employed in other embodiments is omitted. As depicted, system 300 includes enterprise network 370, which includes Open Radio Access (ORAN) equipment 372 coupled to radio resource equipment 180 by distribution infrastructure 340. ORAN equipment 170 includes local centralized units (CUs) 310A-N, and local distributed units (DUs) 320A-N. Radio resource equipment 180 includes layer 1 (L1) interface 352, radio frequency front end (RFE) 354, and multiple-in multiple-out (MIMO) antennas 356A-B.

One or more embodiments of system 300 can be configured such that the embodiments provide various hosted network connections in a virtualized way. As depicted in FIG. 3, ORAN equipment 372 can combine (or separate) UE traffic of multiple MNOs as a function of which network core the UE is associated with (as defined by the UE subscriber identity module (SIM) card information stored on the SIM card). For some of these embodiments, a singular shared network implementation can host more than a single mobile network entity (e.g., public MNOs, or private network operators, or combinations of the two.

In some MOCN implementations, overall over-air radio spectrum resource is can be limited and shared among MNOs, e.g., in some circumstances leading to lower performance levels. One or more embodiments can facilitate enabling the advantage of a MOCN approach to be realized in some circumstances, with the capacity to switch to a MORAN approach, e.g., when limited capacity-density available to each hosted network within the service area affects overall performance.

In some implementations, system 300 can provide a multi-carrier ORAN-based architecture employing a hybrid-combination of MOCN and MORAN virtualized functionality, e.g., by using ORAN equipment 372 to virtualize local CU servers 310A-N and local DU servers 320A-N. In this approach, radio resource equipment 180 (e.g., 5G RAN ("gNB") hardware) can be largely shared by the hosted networks and can therefore be much more cost-effective than deploying dedicated network equipment for each hosted operator.

In additional or alternative embodiments, some network infrastructure can be owned/operated by a service provider and offered in a Network-as-a-Service capacity. In this type of implementation, one or more embodiments can add/change hosted networks on either shared or licensed spectrum without deploying new hardware. For example, an initial deployment may be realized with all hosted operators using SS resources 182, but as capacity in the service area grows and/or more operators are hosted, congestion may cause some of the operators switch to using non-shared spectrum resources 184 provided by one or more embodiments.

System 300 provides an example migration of enterprise network 370 to accommodate the migration to a multi-carrier MORAN function, e.g., with virtual instances of CUS (310A-N), and DUs 320A-N) being hosted by ORAN equipment 372 and with radio resource equipment 180 being reconfigured to operate with a multi-carrier over-air interface. In this example, enterprise network 370 can be transformed from MOCN to MORAN without the need to replace any hardware components, or re-cable an associated fronthaul network.

In one or more embodiments, to facilitate a low-cost reconfiguration of radio resource equipment 180, RFE 354 can be employed using a Software-Defined-Radio (SDR) technology and advanced linearization techniques, e.g., to enable migration to multi-carrier MORAN while adhering to various performance and regulatory limitations.

In some implementations, parts of distribution infrastructure 340 (e.g., the fronthaul interface) can be configured to multiplex one or more separate fronthaul signals onto a single/common cabling/switching infrastructure. One approach to this can utilize L1 interface 352, and/or Ethernet virtual local area network (VLAN) separation, e.g., with identifiers associated with sector, polarization and/or frequency.

In some implementations of shared hosting networks, because MNOs may have specific distributed antenna system (DAS) for transmission respective signals, a DAS may provide only limited visibility of key performance indicators (KPIs) of the network. This can occur whether a neutrally hosted network is implemented using SS resources 182 or non-shared spectrum resources 184. In one or more embodiments, by utilizing radio resource equipment 180, KPIs can be collected and provided to MNOs whether SS resources 182 or non-shared spectrum resources 184 are used.

Figure 4:
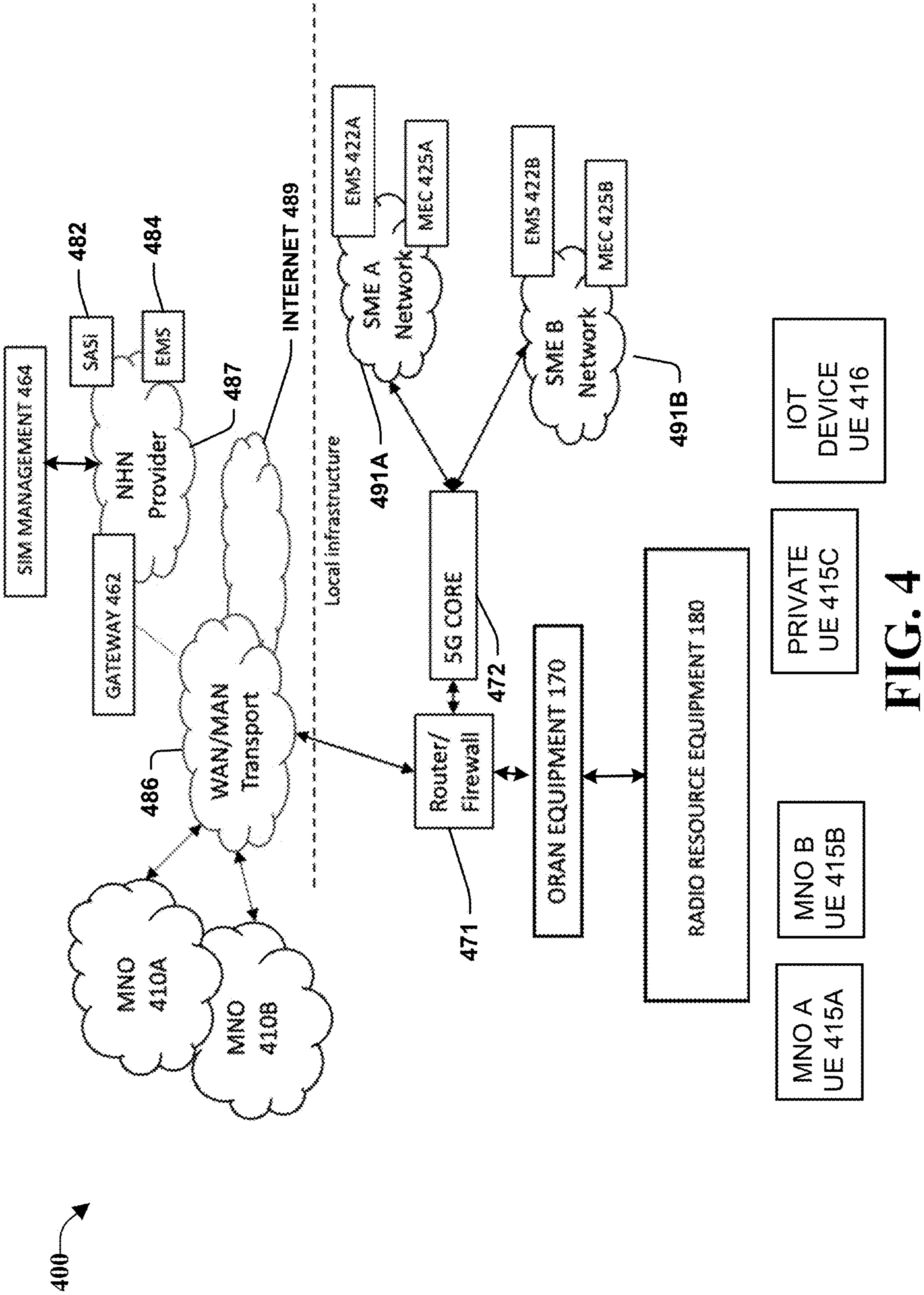
FIG. 4 is an architecture diagram of an example system that can facilitate using shared radio resources to provide wireless services by multiple mobile network operators, in accordance with one or more embodiments.

FIG. 4 is an architecture diagram of an example system 400 that can facilitate using shared radio resources to provide wireless services by multiple mobile network operators, in accordance with one or more embodiments. For purposes of brevity, description of like elements and/or processes employed in other embodiments is omitted.

As depicted, system 400 includes Mobile Network Operators (MNOs) 410A-B, gateway 462, and internet 489 linked via Wide Area Network/Metropolitan Area Network (WAN/MAN) transport equipment 486. ORAN equipment 170 is linked to radio resource equipment 180 and router/firewall 471 that is linked to 5G core 472. As depicted, small to medium enterprises (SMEs) 491A-B respectively include Element Manager Systems (EMSs) 422A-B and Multi-Access Edge Computing (MECs) 425A-B, and are linked to 5G core 472. Gateway 462 is coupled to neutrally hosted network (NHN) provider 487, which includes Service Access Switch interface (SASi) 482 and Element Manager System (EMS) 484, and is coupled to Subscriber Identity Module (SIM) manager 464.

In one or more embodiments, based on one or both of SS resources 182 and non-shared spectrum resources 184, radio resource equipment 180 can be wirelessly coupled to MNO A UE 415A (e.g., UEs served by MNO 410A), MNO B UE 415B, private UE 415C (e.g., a private UE served by the enterprise), and internet of things (IOT) device 416.

Figure 5:
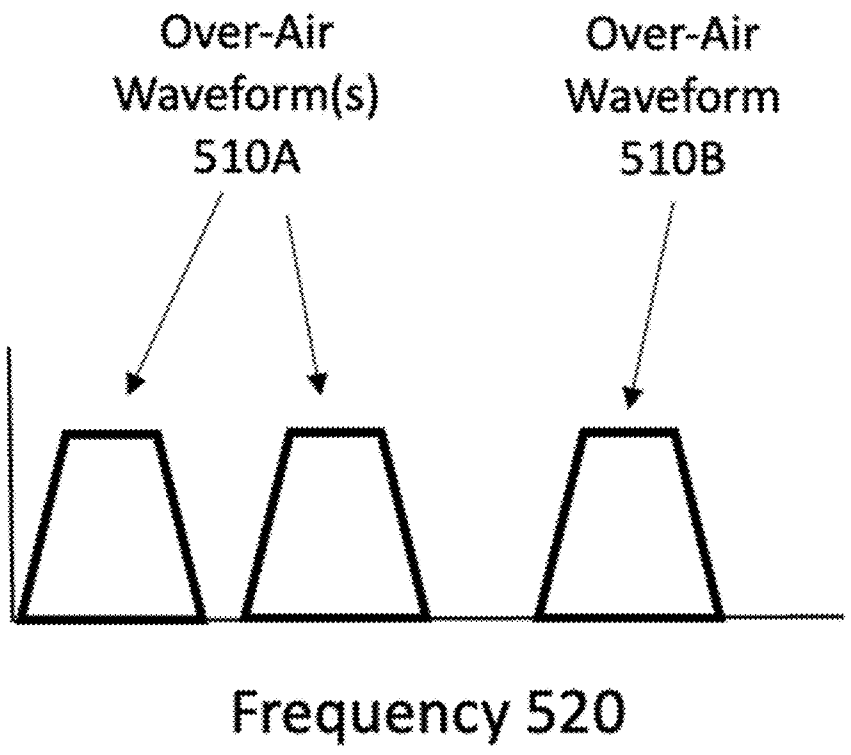
FIG. 5 is a of an example waveform diagram that illustrates results of using shared radio resources to provide wireless services by multiple mobile network operators, in accordance with one or more embodiments.

FIG. 5 is a of an example waveform diagram 500 that illustrates results of using shared radio resources to provide wireless services by multiple mobile network operators, in accordance with one or more embodiments. For purposes of brevity, description of like elements and/or processes employed in other embodiments is omitted.

As depicted, example waveform diagram 500 includes frequency 520 and over-air waveform(s) 510A-B. In some implementations, waveforms 510A can represent non-shared spectrum resources 184, and waveform 510B can represent SS resources 182. waveform diagram 500 illustrates that one or more embodiments can use radio resource equipment 180 to generate signals having both waveforms 510A and waveform 510B.

Figure 6:
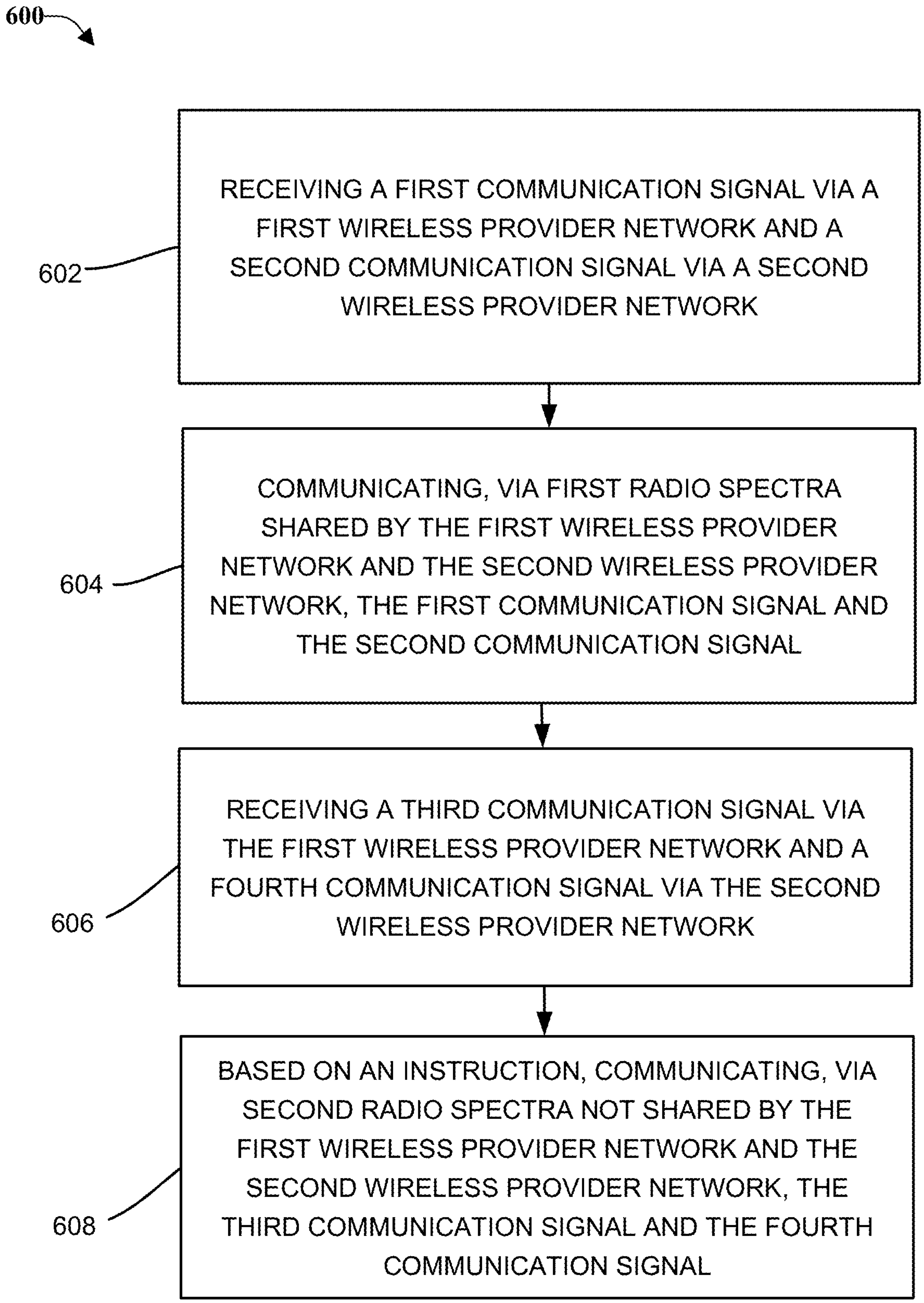
FIG. 6 depicts a flow diagram representing example operations of an example method that can facilitate using shared radio resources to provide wireless services by multiple mobile network operators, in accordance with one or more embodiments.

FIG. 6 depicts a flow diagram representing example operations of an example method 600 that can facilitate using shared radio resources to provide wireless services by multiple mobile network operators, in accordance with one or more embodiments. For purposes of brevity, description of like elements and/or processes employed in other embodiments is omitted.

In some examples, one or more embodiments of method 600 can be implemented by receiving component 122, communicating component 124, routing component 126, and other components that can be used to implement aspects of method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

At 602 of method 600, receiving component 122 can, in one or more embodiments receive a first communication signal via a first wireless provider network and a second communication signal via a second wireless provider network. At 604 of method 600, communicating component 124 can, in one or more embodiments communicate, via first radio spectra shared by the first wireless provider network and the second wireless provider network, the first communication signal and the second communication signal. At 606 of method 600, routing component 126 can, in one or more embodiments receive a third communication signal via the first wireless provider network and a fourth communication signal via the second wireless provider network. At 608 of method 600 can, in one or more embodiments, based on an instruction, communicate, via second radio spectra not shared by the first wireless provider network and the second wireless provider network, the third communication signal and the fourth communication signal.

Figure 7:
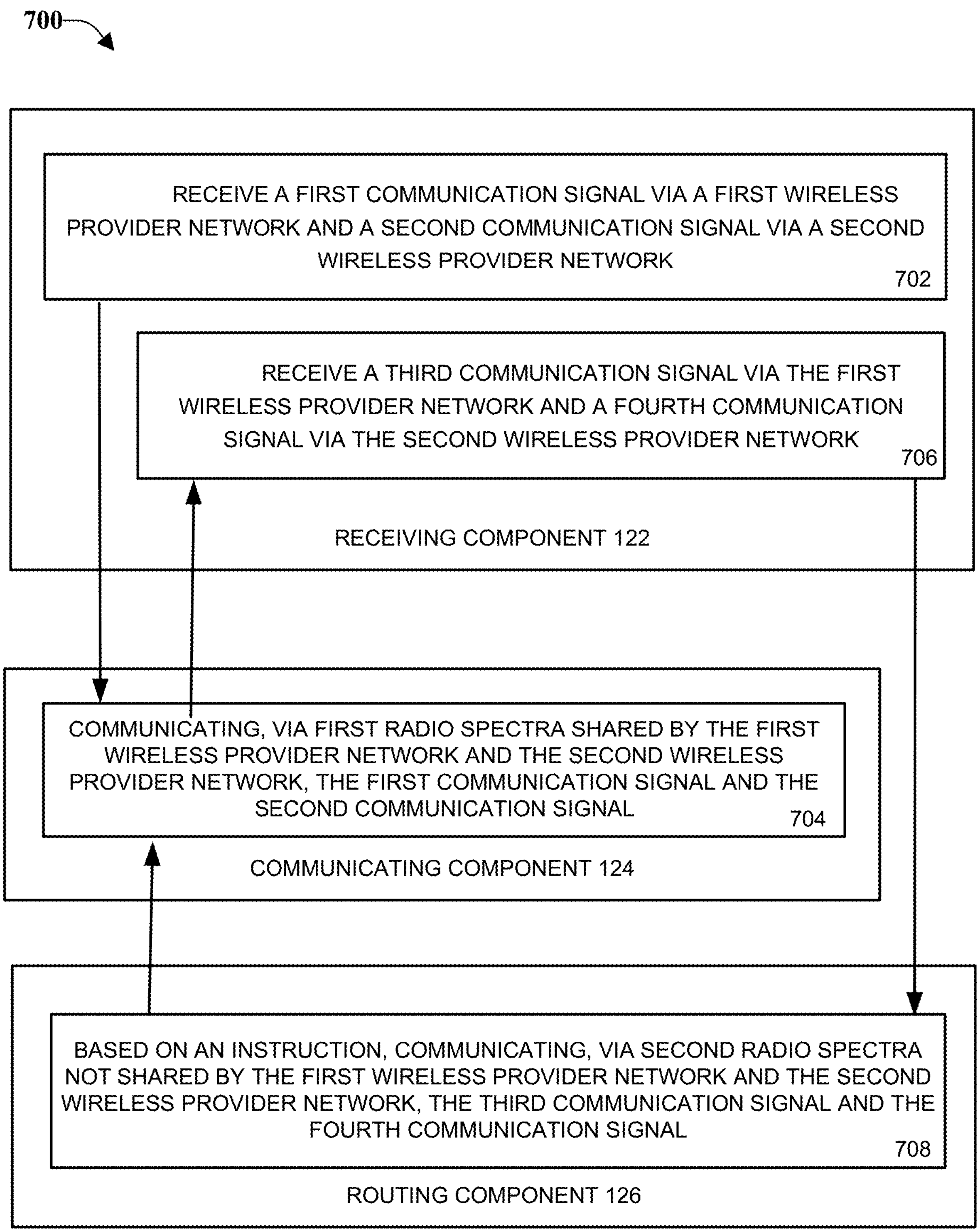
FIG. 7 depicts an example system that can facilitate using shared radio resources to provide wireless services by multiple mobile network operators, in accordance with one or more embodiments.

FIG. 7 depicts an example system 700 that can facilitate using shared radio resources to provide wireless services by multiple mobile network operators, in accordance with one or more embodiments. For purposes of brevity, description of like elements and/or processes employed in other embodiments is omitted. Example system 700 can include receiving component 122, communicating component 124, routing component 126, and other components that can be used to implement aspects of system 800, as described herein, in accordance with one or more embodiments.

At 702 of FIG. 7, receiving component 122 can receive a first communication signal via a first wireless provider network and a second communication signal via a second wireless provider network, in accordance with one or more embodiments. At 704 of FIG. 7, communicating component 124 can communicate, via first radio spectra shared by the first wireless provider network and the second wireless provider network, the first communication signal and the second communication signal. At 706 of FIG. 7, receiving component 122 can receive a third communication signal via the first wireless provider network and a fourth communication signal via the second wireless provider network. At 708 of FIG. 7, routing component 126 can, based on an instruction, communicate, via second radio spectra not shared by the first wireless provider network and the second wireless provider network, the third communication signal and the fourth communication signal.

Figure 8:
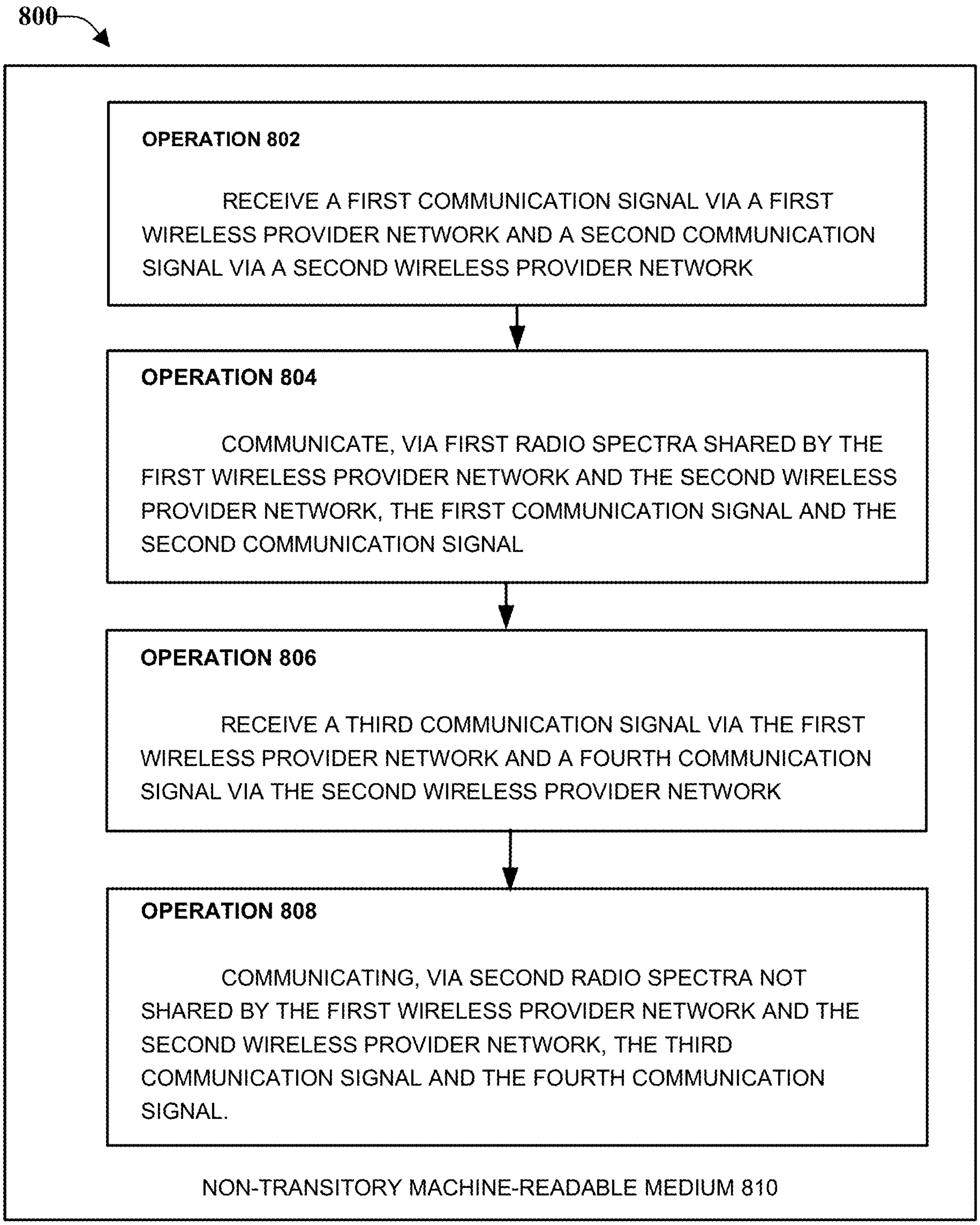
FIG. 8 depicts an example non-transitory machine-readable medium that can include executable instructions that, when executed by a processor of a system, can facilitate using shared radio resources to provide wireless services by multiple mobile network operators, in accordance with one or more embodiments.

FIG. 8 depicts an example 800 non-transitory machine-readable medium 810 that can include executable instructions that, when executed by a processor of a system, can facilitate using shared radio resources to provide wireless services by multiple mobile network operators, in accordance with one or more embodiments. For purposes of brevity, description of like elements and/or processes employed in other embodiments is omitted.

In one or more embodiments, operation 802 of FIG. 8 can facilitate receiving a first communication signal via a first wireless provider network and a second communication signal via a second wireless provider network. In one or more embodiments, operation 804 of FIG. 8 can facilitate communicating, via first radio spectra shared by the first wireless provider network and the second wireless provider network, the first communication signal and the second communication signal. In one or more embodiments, operation 806 of FIG. 8 can facilitate receiving a third communication signal via the first wireless provider network and a fourth communication signal via the second wireless provider network. In one or more embodiments, operation 808 of FIG. 8 can facilitate, based on an instruction, communicating, via second radio spectra not shared by the first wireless provider network and the second wireless provider network, the third communication signal and the fourth communication signal.

Figure 9:
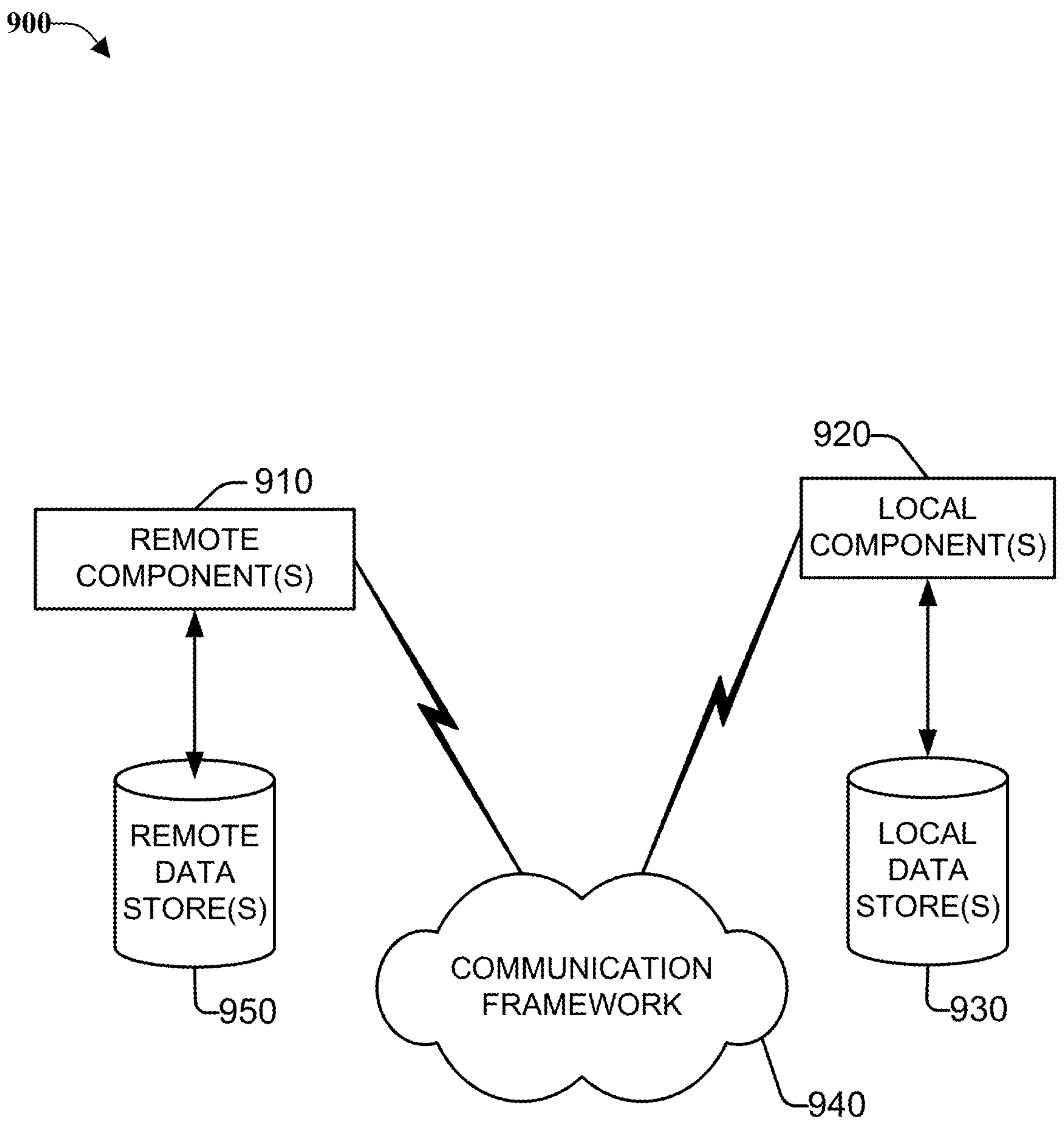
FIG. 9 depicts an example schematic block diagram of a computing environment with which the disclosed subject matter can interact, in accordance with one or more embodiments.

FIG. 9 is a schematic block diagram of a system 900 with which the disclosed subject matter can interact, in accordance with one or more embodiments. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," "data storage," "database." and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 920, non-volatile memory 922, disk storage 924, and memory storage, e.g., local data store(s) 930 and remote data store(s) 950, for which further description is set forth below.

For instance, non-volatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
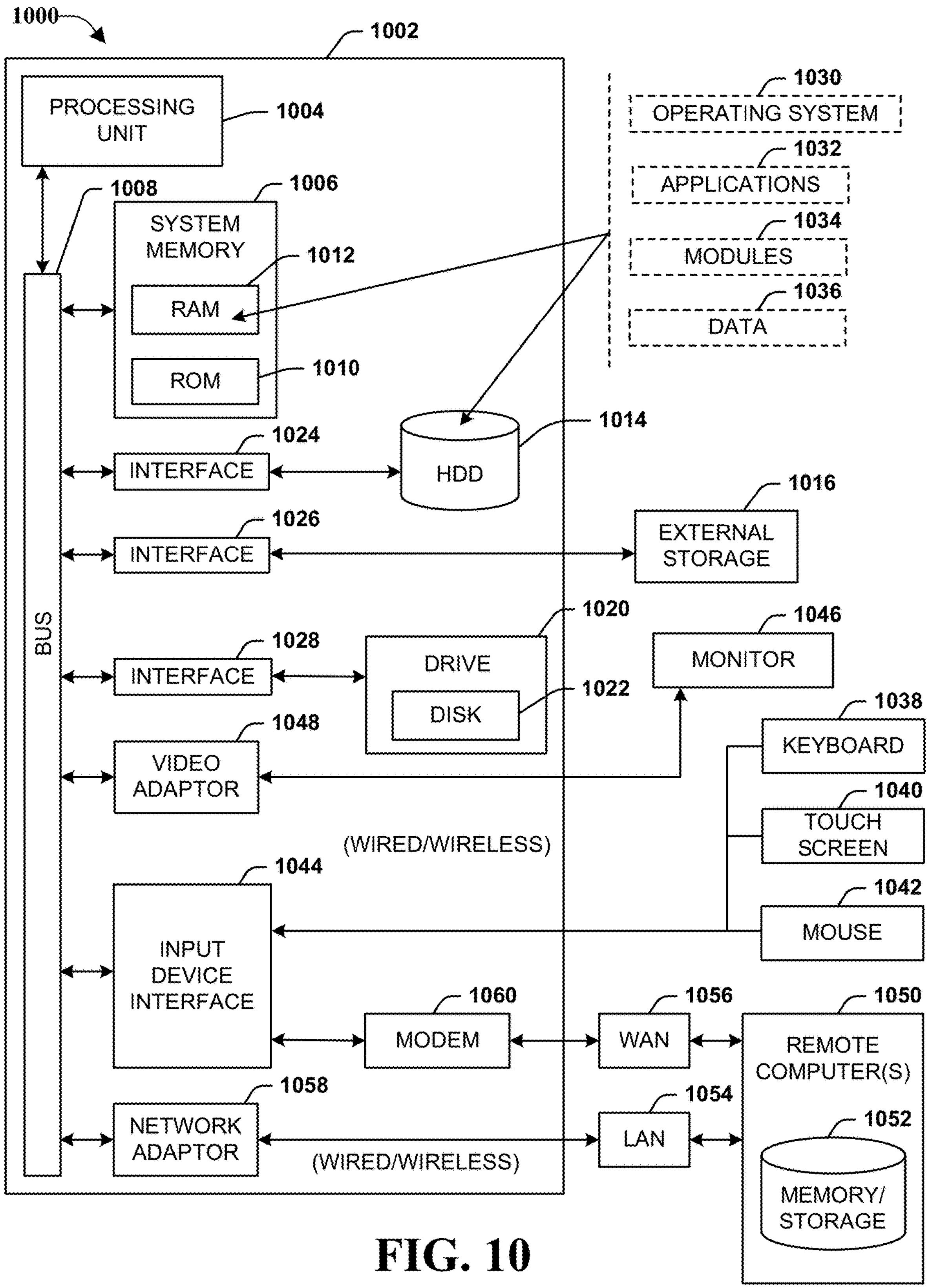
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and non-volatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide non-volatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations," this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. As mentioned above, it will be appreciated that the memory components, or computer-readable storage media, described herein can be either volatile memory or non-volatile storage, or can include both volatile and non-volatile storage. By way of illustration, and not limitation, non-volatile storage can include ROM, programmable ROM (PROM), EPROM, EEPROM, or flash memory. Volatile memory can include RAM, which acts as external cache memory. By way of illustration and not limitation, RAM can be available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side," or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:

facilitating, by a system comprising at least one processor, receiving, by radio access network equipment operating in a multi-operator core network configuration, a first communication signal via a first wireless provider network and a second communication signal via a second wireless provider network, wherein the first wireless provider network was organized in accordance with an open radio access network architecture;

facilitating, by the system, communicating, by virtualized central unit equipment via first radio spectrum resources shared by the first wireless provider network and the second wireless provider network, the first communication signal and the second communication signal; and based on an instruction to transition the radio access network equipment from operating in the multi-operator core network configuration to operating in a multi-operator radio access network configuration, facilitating, by the system:

receiving a third communication signal via first wireless provider core network equipment of the first wireless provider network and a fourth communication signal via second wireless provider core network equipment of the second wireless provider network, communicating, via second radio spectrum resources allocated to the first wireless provider network and not shared with the second wireless provider network, the third communication signal, and communicating, via third radio spectrum resources allocated to the second wireless provider network and not shared with the first wireless provider network, the fourth communication signal.

2. The method of claim 1, wherein the system utilizes shared radio access network equipment for the communicating of the first communication signal, the second communication signal, the third communication signal, and the fourth communication signal.

3. The method of claim 2, wherein the shared radio access network equipment comprises shared wireless access point equipment.

4. The method of claim 1, wherein the communicating of the third communication signal comprises communicating the third communication signal via shared radio access network equipment comprising a shared central unit coupled to a shared distributed unit.

5. The method of claim 1, wherein the receiving of the third communication signal and the fourth communication signal comprises receiving the third communication signal and the fourth communication signal via respective separate core networks of the first wireless provider network and the second wireless provider network.

6. The method of claim 1, wherein the second radio spectrum resources comprise radio spectrum resources allocated to the first wireless provider network.

7. A radio resource device, comprising:

at least one processor; and a memory that stores executable instructions that, when executed by the at least one processor, facilitate performance of operations, comprising:

receiving, from first wireless provider core network equipment, a first communication signal via a first wireless provider network operating in a multi-operator core configuration, receiving, from second wireless provider core network equipment, a second communication signal via a second wireless provider network operating in the multi-operator core configuration, wherein the first wireless provider network was organized in accordance with an open radio access network architecture, communicating, using first radio spectrum shared by the first wireless provider network and the second wireless provider network, the first communication signal and the second communication signal, receiving, a third communication signal via the first wireless provider network and a fourth communication signal via the second wireless provider network, communicating, using second radio spectrum not shared by the first wireless provider network and the second wireless provider network, the third communication signal, and communicating, using third radio spectrum not shared by the first wireless provider network and the second wireless provider network, the fourth communication signal.

8. The radio resource device of claim 7, wherein the radio resource device comprises shared wireless infrastructure capable of communicating via the first radio spectrum and the second radio spectrum.

9. The radio resource device of claim 8, wherein the radio resource device comprises shared base station equipment.

10. The radio resource device of claim 7, wherein the radio resource device comprises virtual central unit equipment coupled to distributed unit equipment.

11. The radio resource device of claim 7, wherein the second radio spectrum comprise radio spectrum allocated to the first wireless provider network.

12. The radio resource device of claim 7, wherein the communicating of the third communication signal and the fourth communication signal results from an instruction to transition to operating in a multi-operator radio access network configuration.

13. A non-transitory machine-readable medium, comprising executable instructions that, when executed by a processor of shared radio access network equipment, facilitate performance of operations, comprising:

communicating, in accordance with a multi-operator core-network configuration organized in accordance with an open radio access network architecture, first different communication signals respectively received from different wireless communication network providers; and based on an instruction to transition to operating in a multi-operator radio access network configuration, communicating, in accordance with the multi-operator radio access network configuration, second different communication signals respectively received from the different wireless communication network providers.

14. The non-transitory machine-readable medium of claim 13, wherein the communicating of the second different communication signals comprises communicating the second different communication signals via shared wireless infrastructure managed by the shared radio access network equipment.

15. The non-transitory machine-readable medium of claim 13, wherein the second different communication signals are received via core network equipment that was respectively managed by the different wireless communication network providers.

16. The non-transitory machine-readable medium of claim 13, wherein the first different communication signals are respectively received via shared core network equipment.

17. The non-transitory machine-readable medium of claim 13, wherein the first different communication signals are respectively communicated using radio spectrum respectively allocated to be usable by the different wireless communication network providers.

18. The non-transitory machine-readable medium of claim 13, wherein the first different communication signals were respectively received by shared wireless access point equipment.

19. The non-transitory machine-readable medium of claim 13, wherein the network equipment comprises shared radio resource unit equipment.

20. The non-transitory machine-readable medium of claim 13, wherein the shared radio access network equipment comprises virtual central unit equipment coupled to virtual distributed unit equipment.

* * * * *